J. D. CUTTER.

SPOOL EXHIBITING CASE.

No. 9,970. Reissued Dec. 13, 1881.

Witnesses:
Edw. H. Brevoort
W. L. Bennem.

Inventor:
John D. Cutter
by S. J. Gordon, Atty.

N. PETERS, Photo-Lithographer, Washington, D. C.

UNITED STATES PATENT OFFICE.

JOHN D. CUTTER, OF NEW YORK, N. Y.

SPOOL-EXHIBITING CASE.

SPECIFICATION forming part of Reissued Letters Patent No. 9,970, dated December 13, 1881.

Original No. 168,460, dated October 5, 1875. Application for reissue filed November 4, 1881.

*To all whom it may concern:*

Be it known that I, JOHN D. CUTTER, of the city, county, and State of New York, have invented a new and useful Improved Spool-Exhibiting Case, (for which Letters Patent No. 168,460 were issued to me, dated October 5, 1875,) which is fully set forth in the following specification and accompanying drawings, in which—

Figure 1:
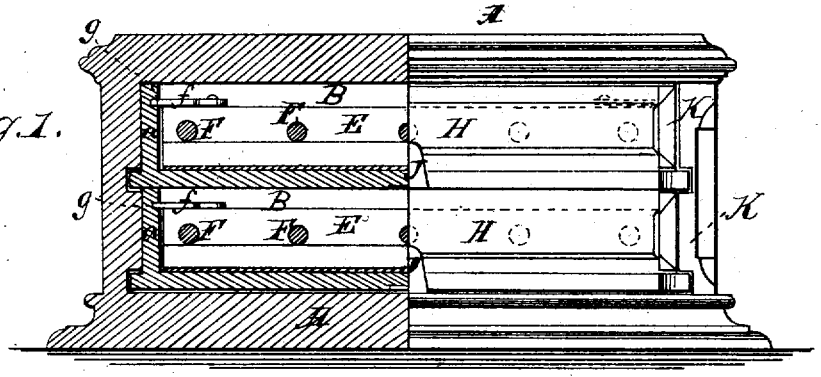
Figure 2:
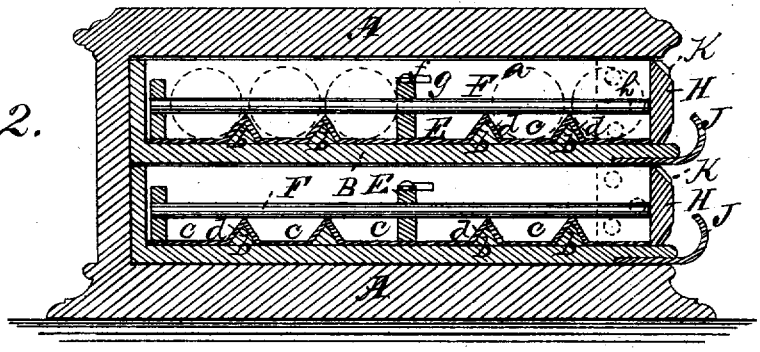
Figure 3:
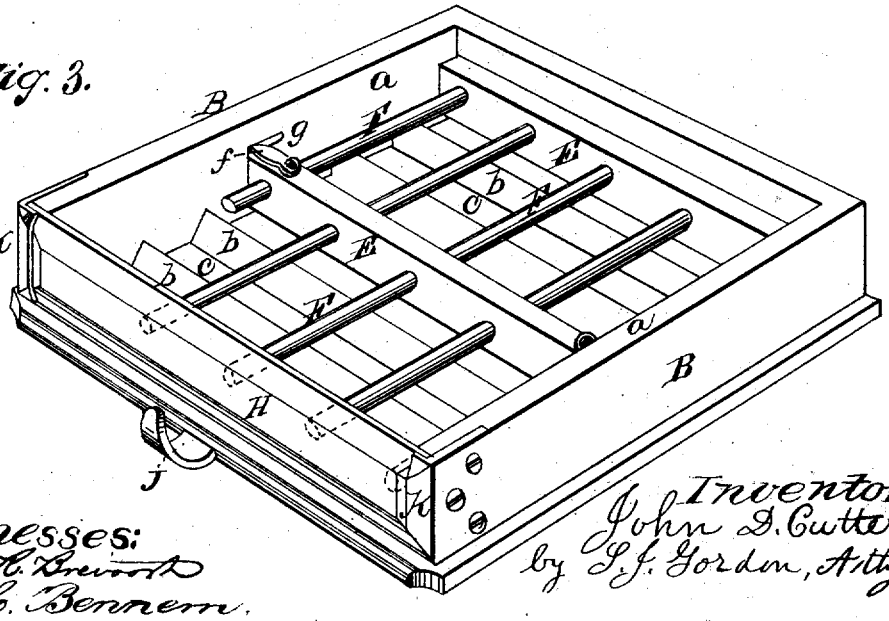

Figure 1 is a front view, partly in vertical section, of a spool-exhibiting case made according to my invention. Fig. 2 is a vertical section at right angles to Fig. 1. Fig. 3 is a perspective view of one of the drawers.

The principal object of the invention is the production of spool-exhibiting cases in which spools of colored silks may be kept in layers which may readily be withdrawn and returned to the cases, and in which, also, the front rows of spools, when the cases are closed, are exhibited at their exteriors either magnified or with several images blended, so that the peculiarities of the tints or shades of color may be more readily noted and appreciated without opening the cases than they can be when plain-glass drawer-fronts are used.

Another object of the invention is the division of the drawers into pockets or compartments for holding the spools in rows with the capability of the drawers being readily cleansed.

The invention consists of certain combinations of devices which are set forth in the claims at the close of this specification; and in order that these combinations may be understood, I have represented in the accompanying drawings and will proceed to describe the mode in which all the combinations were simultaneously embodied by me previous to the date of my said original patent.

A represents a case or cabinet for holding the drawers containing the spools. Said cabinet may be of any suitable construction, and of such dimensions as to enable it to hold any desired number of the drawers.

B represents a drawer having its bottom and three sides made of wood or any other suitable material, said drawer being suitable for holding a quantity of spools in a single layer, as shown in the dotted lines in Fig. 2, and being fitted also to slide in the case or cabinet, so that the layer may be partially or wholly withdrawn and may be reinserted in the case or cabinet. The drawer B has its front H composed of glass, for the purpose of enabling the spools to be seen from the outside of the cabinet, by which means the particular kind of spools contained in each drawer may be known before opening the drawer. The inner side of the glass front H is a plane surface; but the outside is prismatic, by which means two images of a spool in the front row next the glass, (as at *h*, Fig. 2,) may be seen through the glass front blended together so as to look like a magnified spool, with the peculiar effect of light and color produced by exhibiting simultaneously several folds of a silk fabric of the same tint or shade, thus enabling the peculiarities of the tint or shade of color to be readily noted and appreciated.

The drawings show the angular form of plano-prismatic glass front which I have used with success, and by which the desired effect is accomplished. A plano-convex glass front may be substituted for the plano-prismatic front, with the effect of magnifying the apparent size of the front spools as seen from the exterior. The glass front is attached to the drawer by means of two metallic clamps, K, one at each end of the front. Each clamp is attached to one of the side pieces, *a*, by screws or otherwise, and is countersunk therein, so as not to interfere with the ready working of the drawer in its seat in the cabinet. The outer portions of the clamp are bent around over the ends of the front H and made to conform to the beveled or convex shape thereof, fitting closely thereon, so as to hold the front in place against the side pieces, *a*, and also confine it vertically and endwise, and thus prevent displacement in any direction. The clamps may be plated or ornamented in any suitable manner, so as to present a neat and handsome appearance when in place.

The drawer is provided with a finger-piece, J, to facilitate the opening or removal from the cabinet. The bottom of the drawer is provided with a number of ribs, *b*, arranged parallel with each other and with the front of the drawer. These ribs may be of tapering or rounded or other suitable form, and serve as fixed partitions to divide the bottom of the drawer into a number of parallel compartments or recesses, *c*, for holding the spools, as indicated in dotted lines in Fig. 2. The bottom of the drawer, including the ribs and recesses, is covered with a lining, *d*, of cloth, velvet, or other suitable material. The recesses *c* are divided into a number of compartments, each corresponding with the length of a spool, by means of a removable frame-work composed of bars E, arranged parallel with the ribs and recesses, and rods F, arranged transversely thereto. The bars E rest in one or more of the recesses *c*, and the rods F rest on the upper edges of the ribs *b*. The frame-work may be held in place in the drawer by means of buttons *f* on the bars E engaging with grooves *g* in the side pieces, *a*, of the drawer, or in any other suitable manner. By this construction of the frame-work forming the transverse divisions, the application of the lining to the drawer may be accomplished without inconvenience, and the frame-work may be readily removed in order to brush and clean out the bottom of the drawer, which could not be done so readily if the pockets or recesses were formed by fixed partitions transverse to each other. The rods leave the spools well exposed to view when the drawer is open, and allow of their being readily removed by the fingers.

When desired to change the dimensions of the pockets or recesses, the frame-work may be replaced by one having the transverse rods at different distances from each other.

Having thus described a spool-exhibiting case embodying my invention, I declare that I do not claim simply a spool-exhibiting case containing one or more drawers in which the spools may be kept in layers that may be withdrawn and returned to the case; nor do I claim such exhibiting-cases when provided with drawers each fitted with a plain-glass front or with a curved-glass front of uniform thickness, which neither magnifies the spool nor enables two or more images of a spool to be seen simultaneously from the exterior; nor do I claim an exhibiting-case having one or more of its sides, or its top, or both, formed of glass plates whose rims are beveled so as to be prismatic.

I claim as my invention—

1. The combination of the case with the drawer constructed with the glass front specified, as and for the purposes described.

2. The combination of the external case with a drawer, B, constructed with fixed partitions in one direction and with removable rods in a direction transverse to the fixed partitions, substantially as and for the purpose specified.

3. The combination of the external case with the drawer constructed with parallel-lined recesses, and with rods arranged above and transverse to said recesses, substantially as before set forth.

4. The combination of the drawer with parallel fixed partitions in one direction, a removable bar parallel with said fixed partitions, and transverse rods, substantially as before set forth.

JOHN D. CUTTER.

Witnesses:
S. J. GORDON,
J. W. RIPLEY.